March 24, 1931. P. E. KLOPSTEG 1,797,265
INSULATING WALL STRUCTURE
Filed May 6, 1926 2 Sheets-Sheet 1

Inventor:
Paul E. Klopsteg
By Gillson, Mann & Cox
Attys.

March 24, 1931.   P. E. KLOPSTEG   1,797,265
INSULATING WALL STRUCTURE
Filed May 6, 1926   2 Sheets-Sheet 2
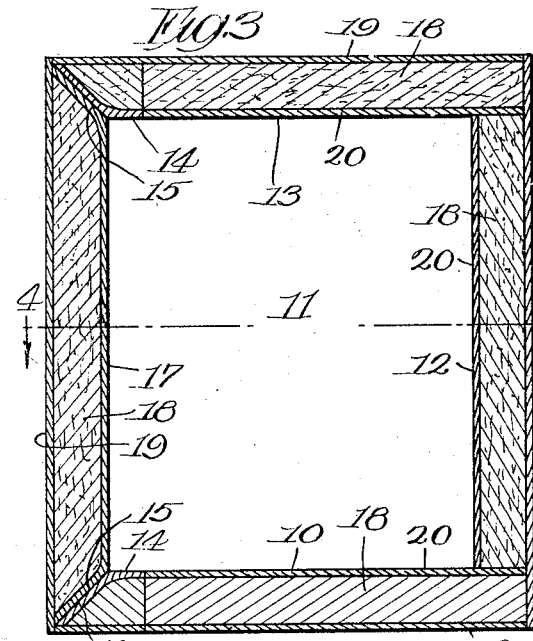
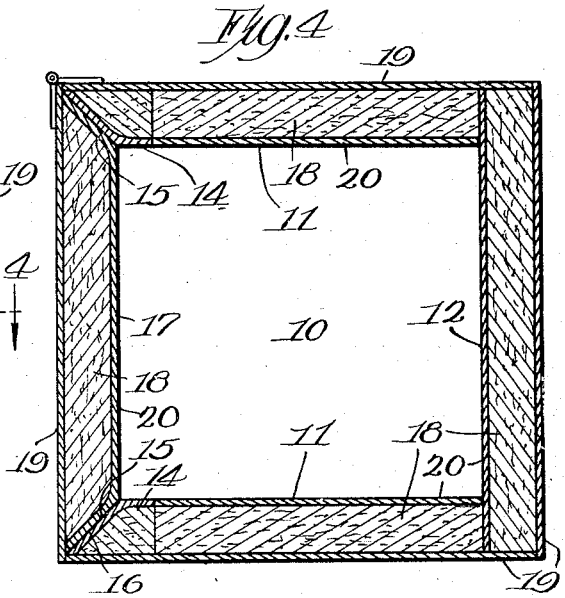
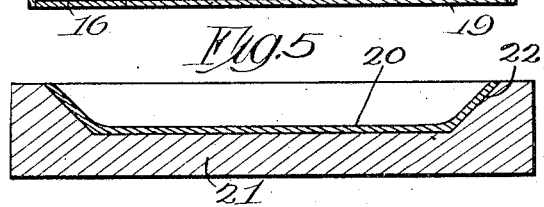
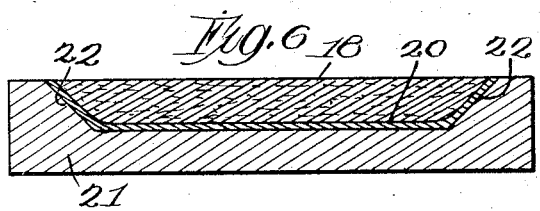
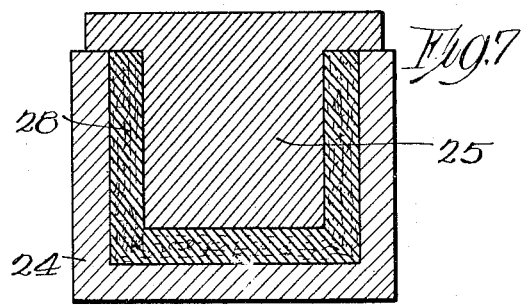
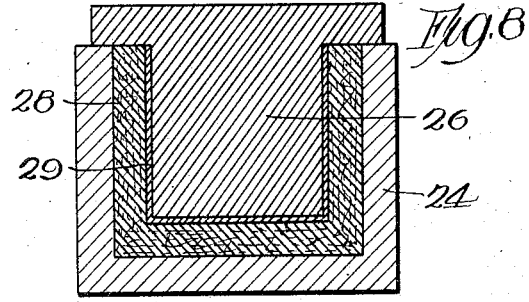
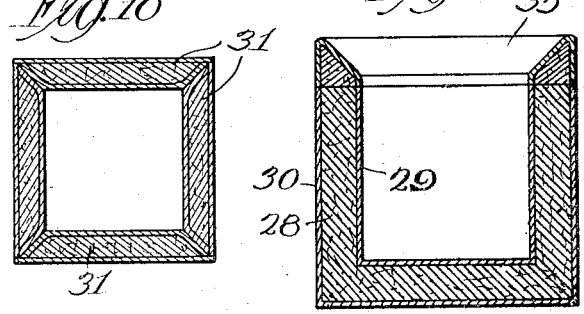
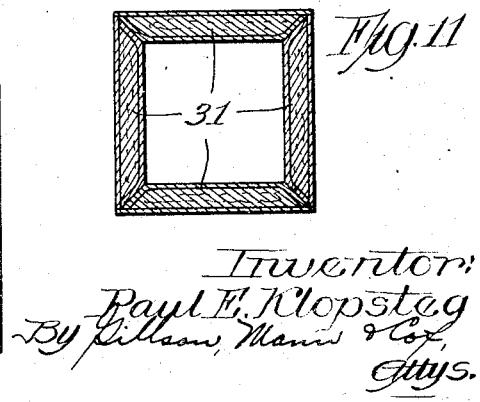
Inventor:
Paul E. Klopsteg Patented Mar. 24, 1931

1,797,265

UNITED STATES PATENT OFFICE

PAUL E. KLOPSTEG, OF CHICAGO, ILLINOIS, ASSIGNOR TO CENTRAL SCIENTIFIC COMPANY, OF CHICAGO, ILLINOIS, A CORPORATION OF ILLINOIS

INSULATING WALL STRUCTURE

Application filed May 6, 1926. Serial No. 107,214.

As a rule composite material possessing the resistance to the transfer of heat desired in a great variety of structures is comparatively frail, porous, presents a rough surface that easily yields to mechanical abrasion, and is likely to shed particles, flakes, or lumps, thus rendering it unsuited either for the inside of heat insulated containers, or the outside of those containers, or the outside walls of laggings, pipe coverings, and the like.

The principal objects of this invention are to produce composite material having throughout its body or base portion the necessary heat insulating properties and faced with a material presenting a hard smooth surface that may also have the ability to resist heat; to produce such composite material in structural forms, or units readily lending themselves to fabrication into containers, coverings, and the like; to produce containers for ovens, refrigerators, and the like, composed of a plurality of simple units that may be easily and cheaply assembled into a firm and lasting structure and to provide a novel process of manufacture.

Further objects and advantages will be revealed as the disclosure proceeds and the description is read in connection with the accompanying drawings, in which—

Fig. 3 is a vertical section through the box shown in Fig. 1;

Fig. 4 is a horizontal section of the same;

Fig. 5 is a vertical section through a mold with a layer of the facing material in place therein;

Fig. 6 is a similar section with a layer of the body or base material on the facing material;

Fig. 7 is a vertical section through a mold for forming five sides of a box-like container with a layer of body or base material in place between the mold and a core;

Fig. 8 is a similar view with a layer of facing material between a core and the layer of body or base material;

Fig. 9 is a vertical section through the box formed by the operation shown in Figs. 7 and 8, with a beveled door frame surrounding the open side;

Figs. 10 and 11 are horizontal and vertical sections, respectively, through a container formed of six similar units.

Figure 1:
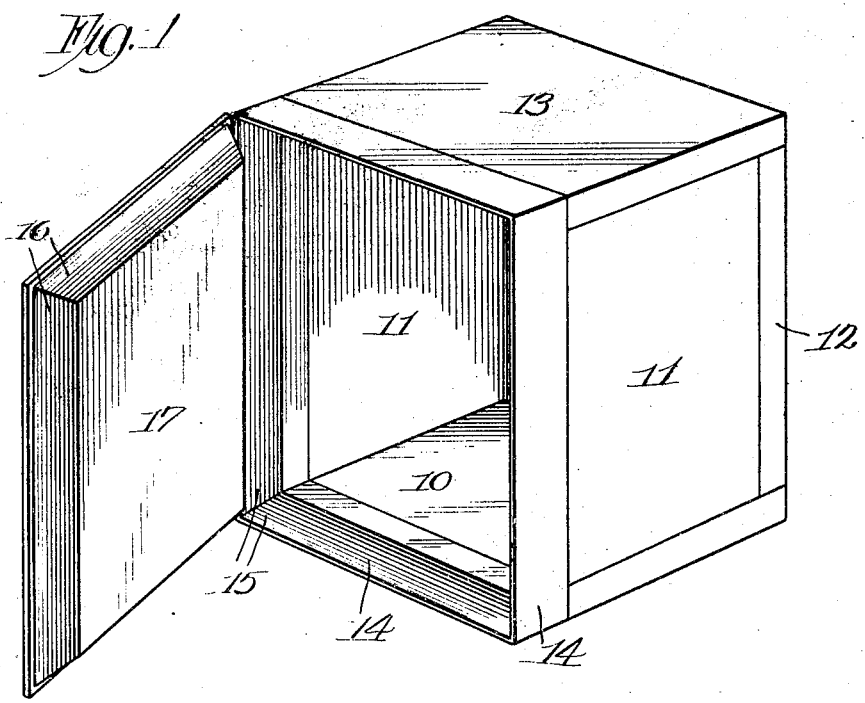
Fig. 1 is a perspective view of an oven box embodying a preferred form of the invention.
Figure 2:
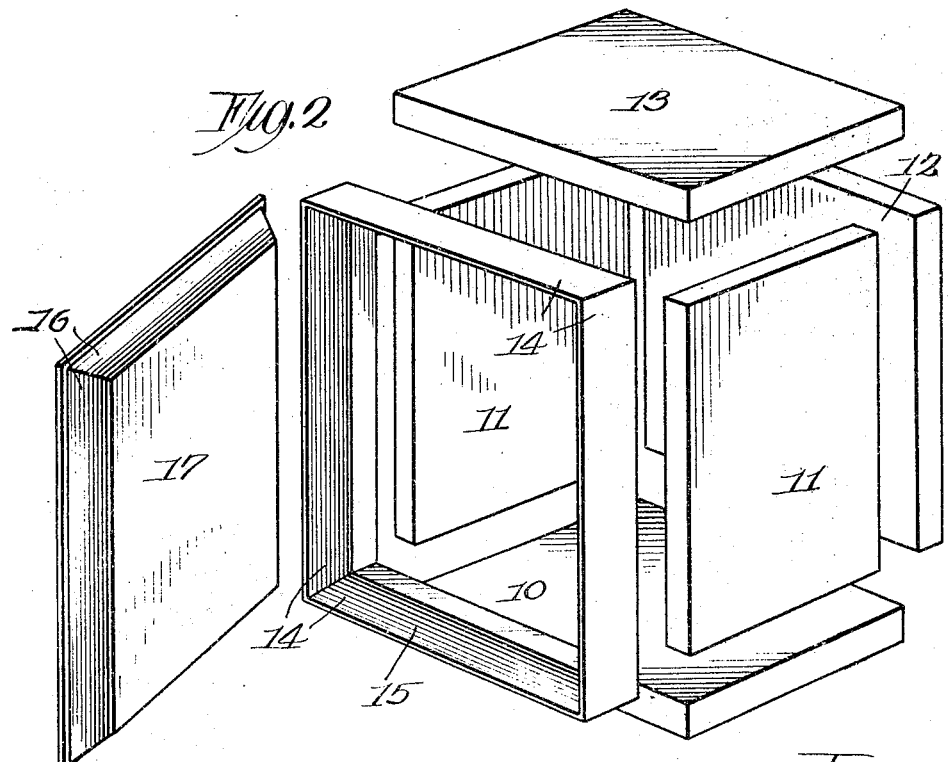
Fig. 2 is a perspective view similar to Fig. 1 with the parts displaced to illustrate their form and approximate relation.

Referring to Figs. 1 and 2, 10 indicates the bottom, 11 the sides, 12 the back, and 13 the top units of the box. The door frame is formed of four identical units, or a single molded unit, 14, secured together in the corners and secured at its edges to the corresponding edges of the bottom 10, the sides 11 and the top 13. The units 14 are beveled at 15 corresponding to the bevel 16 on the edges of the door 17.

Each of the foregoing parts is composed of a body or base portion 18 of material capable of offering high resistance to the transfer of heat, or having high efficiency as a heat insulator. Preferably it is composed of diatomaceous earth about seventy-five percent (75%), hydrate of lime about twelve and one-half percent (12½%) and asbestos fiber about twelve and one-half percent (12½%), compounded in any suitable manner, and the best results will probably be obtained by the procedure described in the patent to Belknap, No. 1,045,933 of December 3, 1912.

This, and equivalent materials, are relatively porous, frail, rough of surface, and likely to shed particles, flakes, or fibers of which it is composed. For that reason it is faced on one side 19, by a material of substantial strength. For ovens and the like it is preferred to use asbestos wall board, metal, wood, etc., as conditions require. It is faced on the other side 20 with a material presenting a hard smooth surface that will not shed, and in the case of ovens, that will resist relatively high temperatures.

Preferably this last material is composed of diatomaceous earth about 75% and Portland cement about 25%, because it is easily molded, will adhere firmly to the base or body layer, presents a surface that can be made very smooth and is sufficiently hard to resist ordinary blows and mechanical abrasion and will endure relatively high temperature throughout a considerable period of service. Other materials having like qualities will, of course, be selected by ceramists for particular purposes.

According to the preferred process the body layer and the smooth surface layer are molded together. The material forming the layer 20 being placed in a suitable mold 21 and the material forming the body or base layer 18 being placed thereon, both being subjected to a curing treatment which may include the application of steam at a pressure of about one hundred twenty five pounds.

The molds shown in Figs. 5 and 6 are constructed to form units substantially like that embodied in the door 17 in Figs. 1, 2, 3 and 4, and like that forming each of the six sides in Figs. 10 and 11. In this it will be observed that the edges 22 are beveled and that the facing material 20 extends entirely across the side of the base or body layer and along the beveled edges. When such a unit is incorporated in the door 17 it is secured to the outer facing 19 of asbestos board, or the like, in any suitable manner, as for example, by sodium silicate cement.

It is, of course, feasible to mold the layers 18 and 20 separately and secure them together by cement, but such a procedure is more expensive and does not produce quite so firm and uniform a bond between the two layers.

The joints between the various units may be formed in any desired way, but I prefer to make use of sodium silicate cement there also.

The units 10, 11, 12 and 13, shown in Figs. 1 and 2, are without the outer facing 19 which were omitted to better illustrate the structure, but it will be understood that individual layers may be applied to each of the five sides, or the structure shown in these figures may be inserted in the open-sided box.

In some instances it will be of advantage to mold the three layers together in which case the layer requiring the smoothest surface is preferably against the mold, the outer layer being brought to the approximate surface by the use of a sand belt, or the like.

The several layers are of substantially the same coefficient of expansion, the advantages of which are obvious in a laminated structure.

In whatever manner the layers are secured together they will form what, for convenience, will be termed a laminated structure. The thickness of this structure and of the individual layers or laminations may vary as occasion may require.

Figs. 7, 8 and 9 illustrate an alternative procedure in forming a box-like container in which an open-sided mold 24 co-operates with a core 25 to form a base or body portion 28 composed of five sides of the heat insulating material. Afterwards the same mold cooperates with a core 26 to form the inner facing layer 29 of hard, smooth surfaced material.

In proceeding after this plan a measured amount of the first material is placed in the mold and the core forced to position. Any excess and air being worked out by moving the core up and down and tapping it lightly. A similar operation with the facing material will form the layers illustrated in Fig. 8.

The door frame 35 (Fig. 9) for use with the five-sided box, may be formed in one piece in a suitable mold after the general manner above described, or in a plurality of pieces, as is most convenient.

After securing it to the five-sided box the whole may be enclosed within a box 30 or the individual sides may be supplied with the outer facing, as circumstances make most desirable.

In Figs. 10 and 11 the enclosure is formed of six units 31 which may all be of the same size and shape, or the sizes and shapes may be varied to change the form from a cube to any other that may be desired. These units are preferably molded after the manner described in connection with Figs. 5 and 6 and secured together in the most suitable manner.

In making laggings, pipe coverings, constant temperature baths, still jackets and the like, similar procedure and similar molds will suffice to get the necessary units, or unitary structures. In the case of some jackets the body or base material will be on the inside and the facing of hard, smooth surface material on the outside.

I claim as my invention:

1. A laminated heat resisting, heat insulating structure including a relatively thick base or body portion of diatomaceous earth, hydrate of lime and asbestos fiber, and a facing for said body portion composed of cement and diatomaceous earth.

2. A laminated heat resisting, heat insulating structure including a molded thick porous layer of heat insulating material and a molded facing layer of dense heat resisting material, said layers being in the condition of having been molded one on the other and said layers having substantially the same coefficient of expansion.

3. A laminated structural unit including two molded layers in the condition of having been molded one on the other, one of said layers being of frail, porous heat insulating material and the other being of dense, strong heat resisting material, one of said layers being composed of diatomaceous earth, hydrate of lime, and asbestos fiber in substantially the proportions of seventy-five percent (75%), twelve and one-half percent (12½%), and twelve and one-half percent (12½%), respectively, the other layer being composed of Portland cement and diatomaceous earth in substantially the proportions of seventy-five percent (75%) diatomaceous earth and twenty-five percent (25%) Portland cement, respectively.

4. A heat insulating, heat resisting wall structure comprising a relatively thick body portion of the desired shape and size composed chiefly of diatomaceous earth mixed with a small proportion of asbestos fiber and a small proportion of alkaline earth binder, said body portion being faced on one side with a layer composed chiefly of diatomaceous earth and cement, the contiguous faces of the body and the facing layer being bonded together.

5. A heat insulating laminated structure comprising a body portion of material having high resistance to the transfer of heat and low resistance to mechanical stress and abrasion and a facing of heat resisting material having a hard smooth surface secured to said body portion, the coefficient of expansion of said facing and body portion being such that the bond between the same will not be disrupted when said structure is subjected to high temperature.

In testimony whereof I affix my signature.

PAUL E. KLOPSTEG.